United States Patent [19]
Naruse et al.

[11] Patent Number: 5,982,977
[45] Date of Patent: *Nov. 9, 1999

[54] APPARATUS AND METHOD FOR SYNTHESIZING INFORMATION SIGNAL AND REPRODUCTION CONTROL SIGNAL AND INFORMATION SIGNAL RECORDING APPARATUS

[75] Inventors: Tetsuya Naruse; Michimasa Komatsubara, both of Chiba; Jun Iwasaki, Tokyo; Teruo Masaki, Chiba; Kaname Mori, Kanagawa, all of Japan

[73] Assignee: Sony Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/755,101

[22] Filed: Nov. 22, 1996

[30] Foreign Application Priority Data

Dec. 4, 1995 [JP] Japan ...................................... 7-339959

[51] Int. Cl.[6] ................................ H04N 5/76; H04N 5/92
[52] U.S. Cl. .................................. 386/64; 386/94; 386/95; 360/15; 360/60; 380/3; 380/5
[58] Field of Search .................................. 386/94, 52, 64, 386/4, 95; 360/60, 15; 380/3–5, 34, 46, 48; 375/200, 201, 202, 203, 204, 205, 206, 207, 208, 209, 210; 369/83–84; H04N 5/76, 5/92, 9/79

[56] References Cited

U.S. PATENT DOCUMENTS

| | | | |
|---|---|---|---|
| 5,073,925 | 12/1991 | Nagata et al. | 380/3 |
| 5,134,496 | 7/1992 | Schwab et al. | 360/60 |
| 5,315,448 | 5/1994 | Ryan | 360/60 |
| 5,319,735 | 6/1994 | Preuss et al. | |
| 5,510,900 | 4/1996 | Shirochi et al. | 360/60 |
| 5,673,357 | 9/1997 | Shima | 386/94 |

FOREIGN PATENT DOCUMENTS

| | | |
|---|---|---|
| 0256753 | 2/1988 | European Pat. Off. |
| 0298691 | 1/1989 | European Pat. Off. |
| 0618723 | 10/1994 | European Pat. Off. |

OTHER PUBLICATIONS

Bender et al., "Techniques for data hiding", Proceedings of the SPIE, vol. 2420, pp. 164–173 (Jan. 1, 1995).

Primary Examiner—Thai Tran
Attorney, Agent, or Firm—Jay H. Maioli

[57] ABSTRACT

A synthesis signal which was reproduced from reproducing apparatus and converted into an analog signal includes an analog information signal and a copy control code. The copy control code is modulated by a spread spectrum. A code reading unit of the recording apparatus extracts the copy control code by an inverse spread spectrum. A code changing unit changes the copy control code by a spread spectrum as necessary. An output signal of the code changing unit is converted into a digital signal. The digital signal is subjected to processes necessary for recording and is recorded to a recording medium.

3 Claims, 11 Drawing Sheets

APPARATUS AND METHOD FOR SYNTHESIZING INFORMATION SIGNAL AND REPRODUCTION CONTROL SIGNAL AND INFORMATION SIGNAL RECORDING APPARATUS

BACKGROUND OF THE INVENTION

1. Field of the Invention

The present invention relates to information signal recording apparatus and method, information signal copying system and method, and an information signal recording medium. More particularly, the invention relates to a copy prevention system in which a signal is not lost even in a communication by an analog signal.

2. Description of the Prior Art

Figure 1:
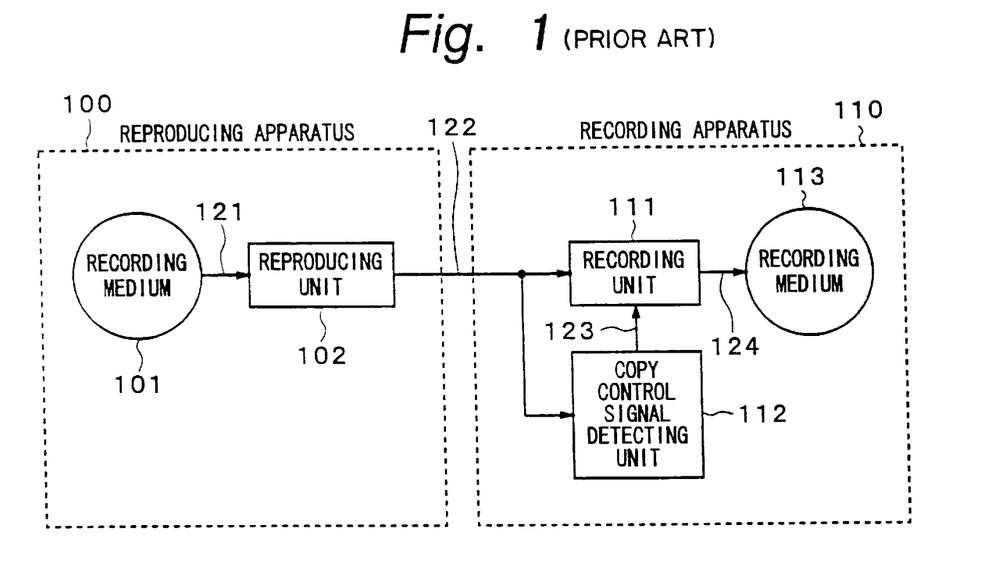
FIG. 1 is a block diagram showing a principle of a copy prevention system.

There are some methods for copy prevention in a recording system of digital data, for example, a digital VTR (video tape recorder). One of them is a method of inhibiting a copy by adding a copy control signal to digital data. First, a principle of a copy prevention system will be described. FIG. 1 is a diagram showing the principle of the copy prevention system. In FIG. 1, reference numeral 100 denotes a reproducing apparatus; 101 a recording medium for reproduction; 102 a reproducing unit; 110 a recording apparatus; 111 a recording unit; 112 a copy control signal detecting unit; 113 a recording medium for recording; 121 a read signal from the recording medium 101; 122 a reproduction signal which is supplied from the reproducing apparatus 100 to the recording apparatus 110; 123 a copy control signal; and 124 a write signal to the recording medium 113.

In the reproducing apparatus 100 constructed by the recording medium 101 for reproduction and the reproducing unit 102 in FIG. 1, a recording signal is read out from the recording medium 101 by the reproducing unit 102 and is outputted as a digital or analog reproduction signal 122. On the other hand, in the recording apparatus 110 constructed by the recording unit 111, copy control signal detecting unit 112, and recording medium 113 for recording, the copy control signal detecting unit 112 detects the copy control signal 123. In accordance with the detection result, the recording unit 111 generates the write signal 124 which inhibits or permits the recording to the recording medium 113 for recording.

Figure 2:
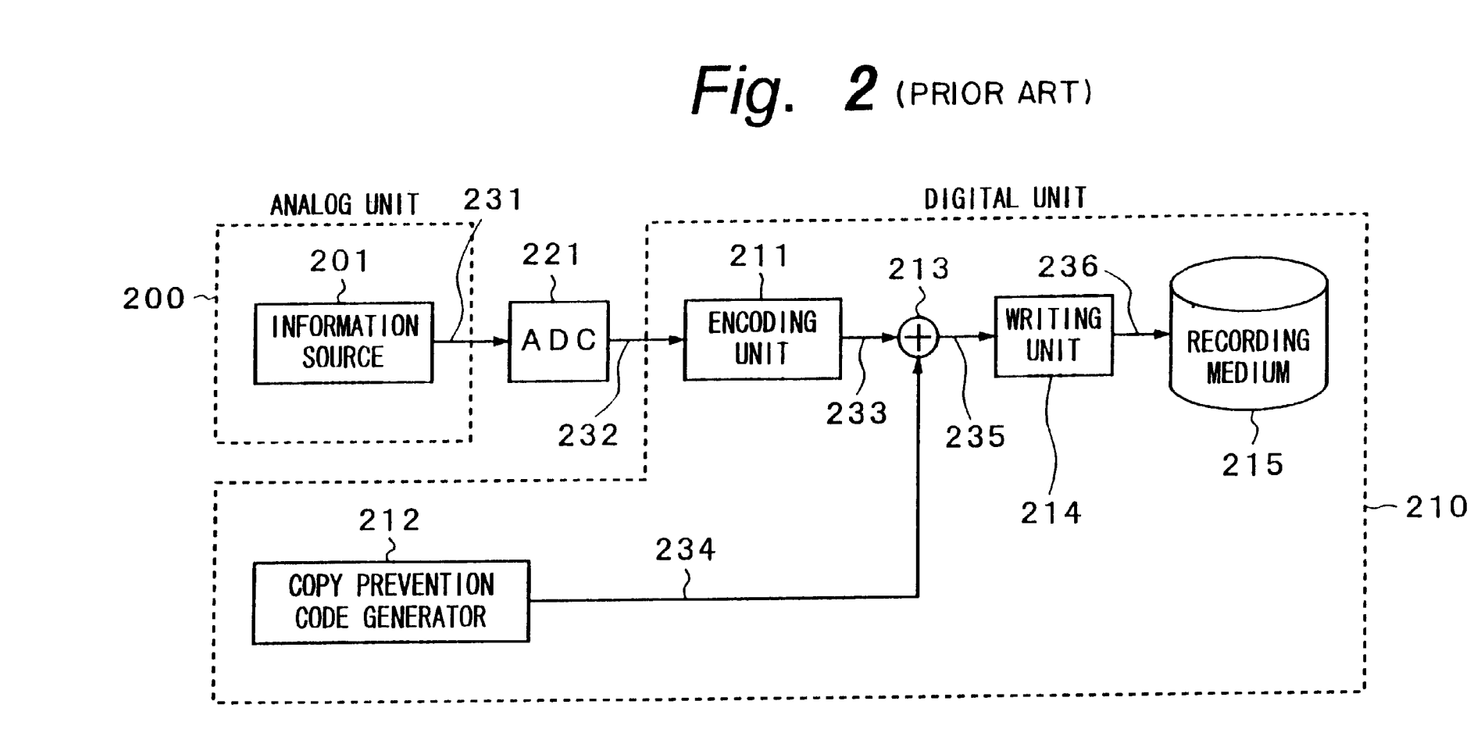
FIG. 2 is a block diagram of an example of a recording apparatus according to a digital signal of a copy control code.

The recording apparatus for recording a signal to the recording medium 101 which is reproduced by the reproducing apparatus 100 will now be described. FIG. 2 is a block diagram of the recording apparatus by a digital signal. In FIG. 2, reference numeral 200 denotes an analog unit; 201 an information source from which information to be recorded is generated; and 210 a digital unit. The digital unit 210 comprises: an encoding unit 211, a copy prevention code generator 212, a synthesizer 213, a writing unit 214, and a recording medium 215. An analog information signal 231 is converted to a digital information signal 232 by an ADC (analog/digital converter) 221 and is supplied to the digital unit 210. In the digital unit 210, the encoding unit 211 encodes the digital information signal and supplies an information code 233 to the synthesizer 213. The synthesizer 213 synthesizes the information code 233 and a copy prevention code 234 from the copy prevention code generator 212. An output signal 235 from the synthesizer 213 is supplied to the writing unit 214 and an output signal 236 of the writing unit 214 is recorded in the recording medium 215. The information code 233 and copy prevention code 234 are recorded in the recording medium 215. The system of FIG. 2 can be applied to, for example, a mastering of a read-only disk medium.

Figure 3:
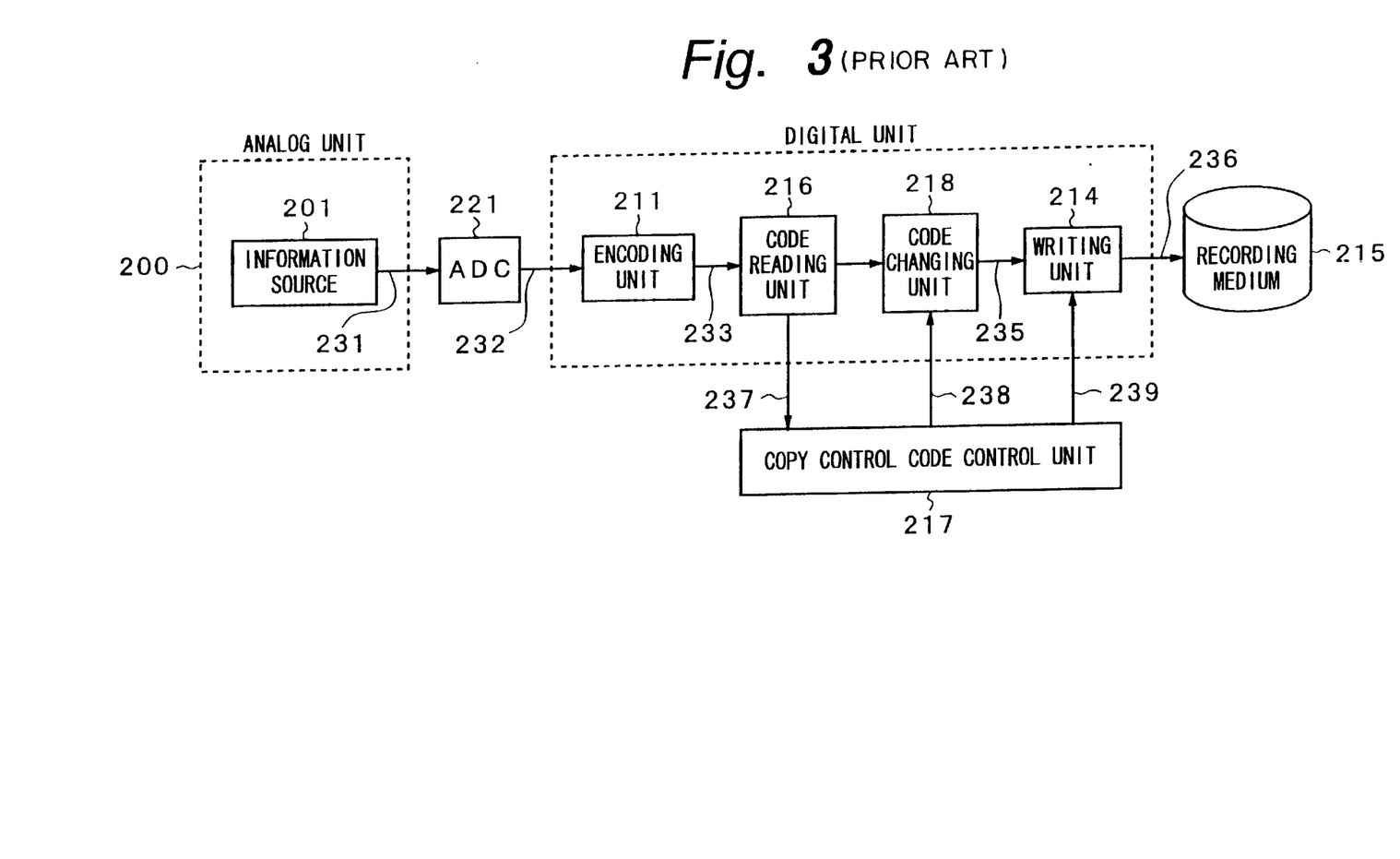
FIG. 3 is a block diagram of another example of a recording apparatus by a digital signal of a copy control code.

FIG. 3 shows another example of a recording apparatus for digitally recording. According to the example of FIG. 3, the copy prevention code is added in the encoding unit 211. The information code 233 from the encoding unit 211 is supplied to a code reading unit 216 and an added copy prevention code 237 is separated. The copy prevention code is supplied to a control unit 217 of the copy prevention code. The control unit 217 limits a generation of copy. For example, when the copy prevention code is a code for permitting a copy of one generation, the control unit 217 generates a control signal 238 for rewriting the copy prevention code to a code for inhibiting the copy and a control signal 239 for instructing permission or inhibition of the recording of a signal to the recording medium 215 by the writing unit 214. When the original copy prevention code permits the copy of one generation, the control signal 238 is supplied to a code changing unit 218, the copy prevention code is changed to a code having the contents of inhibiting the copy, and the writing is permitted by the control signal 239. The system of FIG. 3 can be applied to, for example, a digital VTR.

Figure 4:
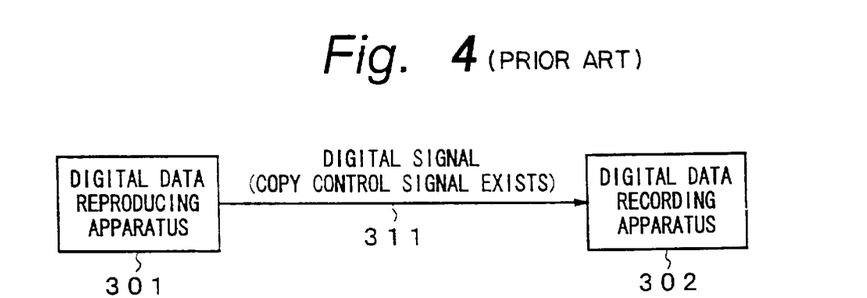
FIG. 4 is a block diagram schematically showing a copy system by a digital connection.

In a copy system using a digital medium, the operation in case of a digital connection and the operation in case of an analog connection are different. Examples in those cases will now be described, respectively. First, the digital connection will be described. FIG. 4 is a schematic diagram of a copy system by the digital connection. Reference numeral 301 denotes a digital data reproducing apparatus; 302 a digital data recording apparatus; and 311 a digital signal. As for the operation of FIG. 4, the digital signal 311 is supplied from the digital data reproducing apparatus 301 to the digital data recording apparatus 302 and the recording operation of the digital data recording apparatus 302 is controlled by the copy control signal included in the digital signal 311.

Figure 5:
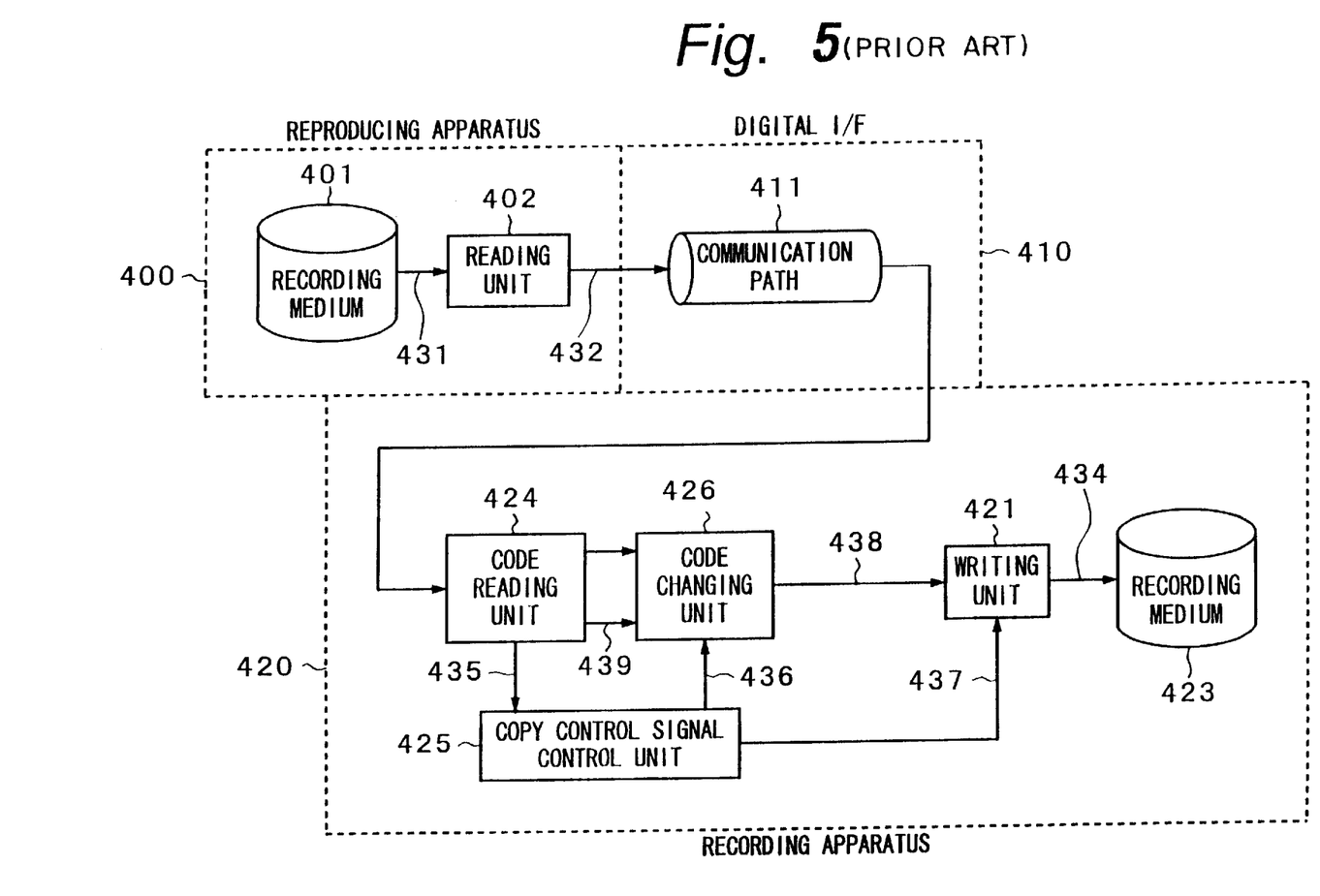
FIG. 5 is a block diagram of an example of the copy system by the digital connection.

FIG. 5 shows an example of the copy system by the digital connection. In FIG. 5, reference numeral 400 denotes a reproducing apparatus; 401 a recording medium on the reproduction side; 402 a reading unit; 410 a digital interface; 411 a communication path; 420 a recording apparatus; 424 a copy prevention code reading unit; 425 a copy control signal control unit; 426 a code changing unit; 421 a writing unit; 423 a recording side recording medium; 431 a read signal; 432 a digital reproduction signal; 435 a copy prevention code which was read; 436 and 437 control signals; and 438 a write signal.

The operation of the construction of FIG. 5 will now be described. In the reproducing apparatus 400 comprising the recording medium 401 for reproduction and reading unit 402, the read signal 431 obtained from the recording medium 401 is supplied to the reading unit 402 and is outputted as a digital reproduction signal 432. The digital reproduction signal 432 passes through the communication path 411 of the digital interface 410 and is supplied to the code reading unit 424 and the copy prevention code 435 is separated. The copy control signal control unit 425 decodes the separated copy prevention code 433 and reads the information. The control signal 436 for changing the copy prevention code is outputted to the code changing unit 426 and the control signal 437 for instructing the permission or inhibition of the recording of the signal to the recording medium 423 is outputted to the writing unit 421. In the construction of FIG. 5, not only the permission and inhibition of the recording but also the limitation of the copy about the generation can be performed.

Figure 6:
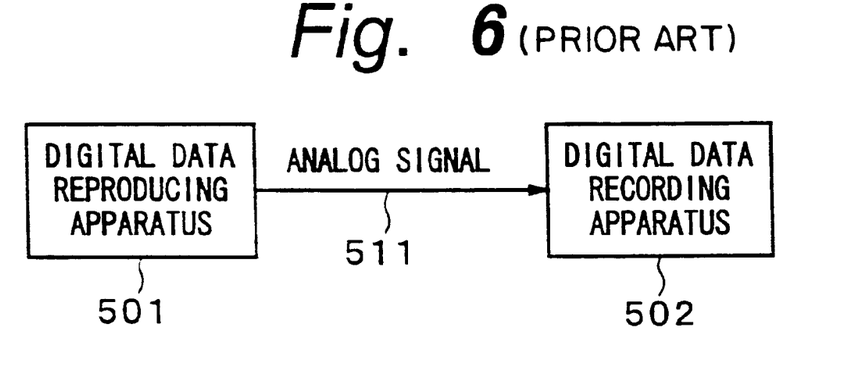
FIG. 6 is a block diagram schematically showing a copy system by an analog connection.

The copy system by the analog connection will now be described. FIG. 6 shows a schematic construction. Reference numeral 501 denotes a digital data reproducing apparatus; 502 a digital data recording apparatus; and 511 an analog signal transmitted between the apparatuses 501 and 502. In the construction of FIG. 6, the analog signal 511 which was D/A converted and outputted from the digital data reproducing apparatus 501 is inputted to the digital data recording apparatus 502 and is A/D converted and digitally recorded. In such a system, when the copy control signal has been extinguished in the analog signal 511, the copy prevention control cannot be executed in the digital data recording apparatus 502.

A few methods have been proposed as a method of preventing the copy by an analog interface. For example, when the analog signal is a video signal, a phase of a color burst of an analog video signal to be outputted is partially inverted or a pseudo synchronization signal having an extremely large level is inserted as a sync signal for AGC, so that even if the normal reproduction can be performed. When the video signal is recorded by the VTR, a normal reproduction image is not obtained in a monitor receiver.

In a conventional copy system, a digital copy prevention code is added to a signal in which an information source was digitally encoded. In case of a digital interface, therefore, the digital recording apparatus detects the copy control signal and can execute the copy prevention control. Even if the digital data reproducing apparatus is used, however, in case of an analog interface, the digital signal as a copy control signal added by the D/A conversion is dropped out. The copy control signal cannot be consequently detected in the digital recording apparatus in which the signal is finally recorded. The copy prevention control cannot be performed. Thus, it is necessary to prevent the copy by using the difference between the AGC methods of the VTR and the monitor receiver or the difference between the characteristics of the APC methods.

As mentioned above, when executing the copy prevention by using the difference between the AGC methods of the VTR and the monitor receiver or the difference between the APC characteristics, there is a fear of occurrence of problems such that the copy cannot be prevented, a reproduction image of the monitor receiver is disturbed by a countermeasure for the copy prevention, or the like.

OBJECTS AND SUMMARY OF THE INVENTION

It is, therefore, an object of the invention to provide information signal recording apparatus and method, information signal copy system and method, and an information signal recording medium which can certainly prevent a copy in case of an analog interface and hardly exerts an influence such as deterioration or the like on an original signal in that case.

According to an aspect of the invention, there are provided information signal synthesizing apparatus and method characterized in that an information source generates a main information signal, a sub information source generates a sub information signal, a spread spectrum unit performs a spread spectrum process to the sub information signal, and a synthesizer synthesizes the spread spectrum processed sub information signal which is supplied from the spread spectrum unit and the main information signal from the information source, thereby generating a synthesis information signal.

According to another aspect of the invention, there are provided information signal synthesizing apparatus and method characterized in that an information reading unit reproduces a sub information signal from a synthesis signal of a main information signal and a spread spectrum processed sub information signal by executing an inverse spread spectrum process to the spread spectrum processed sub information signal and generates the main information signal, a sub information signal control unit forms a change sub information signal by changing the sub information signal which is supplied from the information reading unit, and a synthesizer forms a synthesis signal of the changed sub information signal which was spread spectrum processed and the main information signal from the changed sub information signal and the main information signal from the information reading unit.

According to the invention, there is also provided an information signal recording apparatus characterized in that an information reading unit reproduces a copy control signal by executing an inverse spread spectrum process to a spread spectrum processed copy control signal from an analog synthesis signal of a main information signal and the spread spectrum processed copy control signal, an analog/digital converter converts the synthesis signal to a digital signal, the permission and inhibition of the recording of the digital output signal to a recording medium by a recorder are controlled in accordance with the copy control signal.

In the invention, since a band of the addition information such as a copy control signal or the like is widened by the spread spectrum process and the addition information is added to the signal band of the information source, the copy control signal cannot be deleted by a filter or the like. Since the spread spectrum processed signal is added, an influence by a deterioration or the like is hardly exerted on the original data. Further, as long as no synchronization is obtained at a timing when the spread spectrum is performed, it is difficult to perform not only the detection of the addition of the signal but also the detection of the copy control signal. In addition, different codes can be used as a PN code which is used for the spread spectrum and a several kinds of orthogonal codes can be also multiplied. According to the invention, therefore, since the copy control signal is not erased even after the digital signal was D/A converted, the copy is prevented for the digital data recording apparatus which is connected in an analogwise manner. Since the copy control signal is not erased even in the signal recorded in the analog recording apparatus and the copy control signal cannot be deleted by a filter or the like, a very high effect of copy prevention can be obtained. Further, there is an advantage such that by multiplying the kind of spread spectrum and the orthogonal functions, an amount of information which can be added can be freely controlled.

The above and other objects and features of the present invention will become apparent from the following detailed description and the appended claims with reference to the accompanying drawings.

DETAILED DESCRIPTION OF THE PREFERRED EMBODIMENTS

Figure 7:
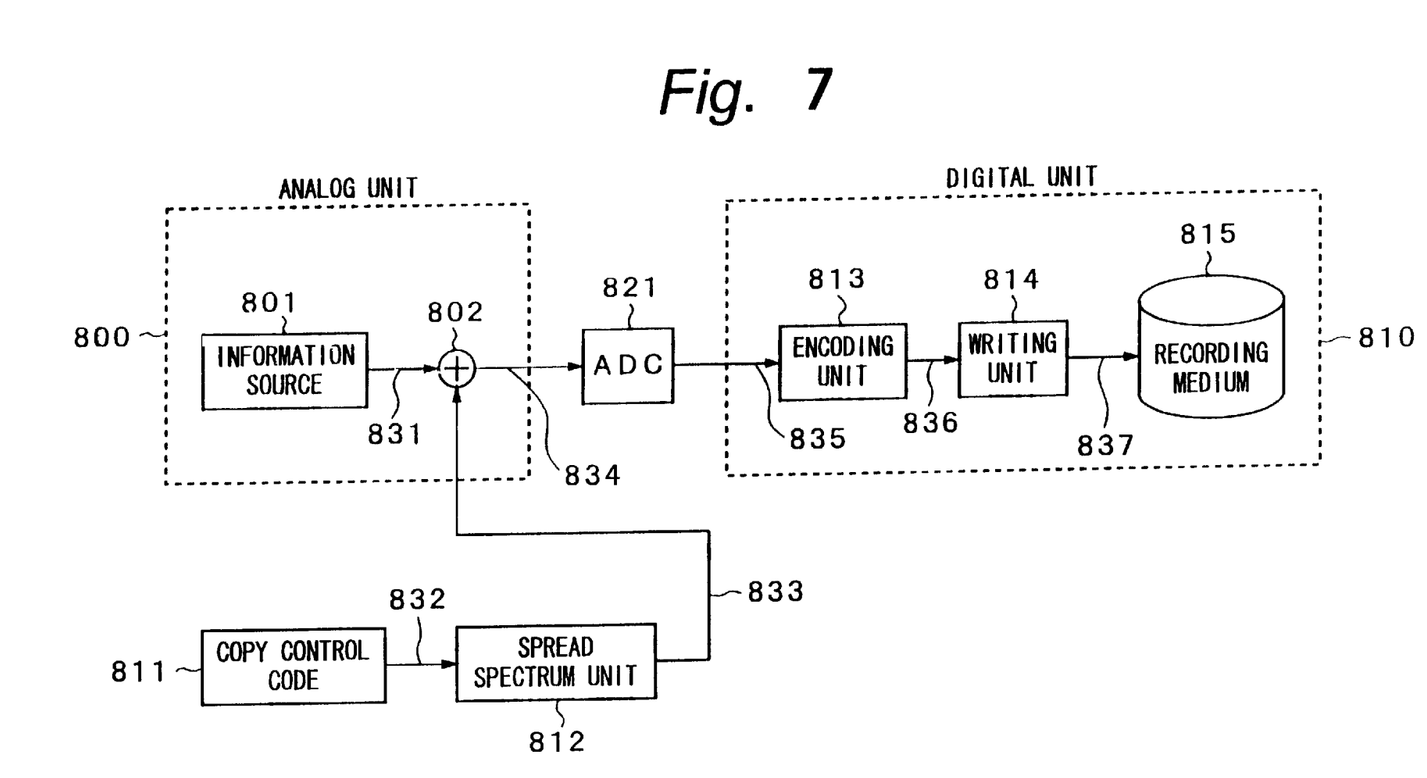
FIG. 7 is a block diagram of an embodiment of a recording apparatus by an analog signal of a copy control code according to the invention.

An embodiment of the invention will now be described hereinbelow with reference to the drawings. FIG. 7 is a diagram showing a construction of an embodiment of a recording apparatus according to the invention.

In FIG. 7, an analog unit 800 has an information source 801 for generating an information signal to be recorded and a synthesizer 802 for synthesizing an information signal 831 and a copy control code 833. A synthesis signal 834 from the synthesizer 802 is converted into a digital signal by an ADC (analog/digital converter) 821. The digital signal is supplied to a digital unit 810.

A copy control code generating unit 811 generates a copy control code 832 to control a copy prevention. The copy control code 832 is supplied to a spread spectrum unit 812 and is spread spectrum processed. The spread spectrum processed copy control code 833 is supplied to the synthesizer 802. A synthesis signal 835 which was converted into the digital signal is supplied to an encoding unit 813. The encoding unit 813 encodes digital information and its output 836 is supplied to a writing unit 814. A write signal 837 from the writing unit 814 is recorded into a recording medium 815. By a construction of FIG. 8, the copy control code of the same band as that of the analog signal of the information source can be added.

Figure 8:
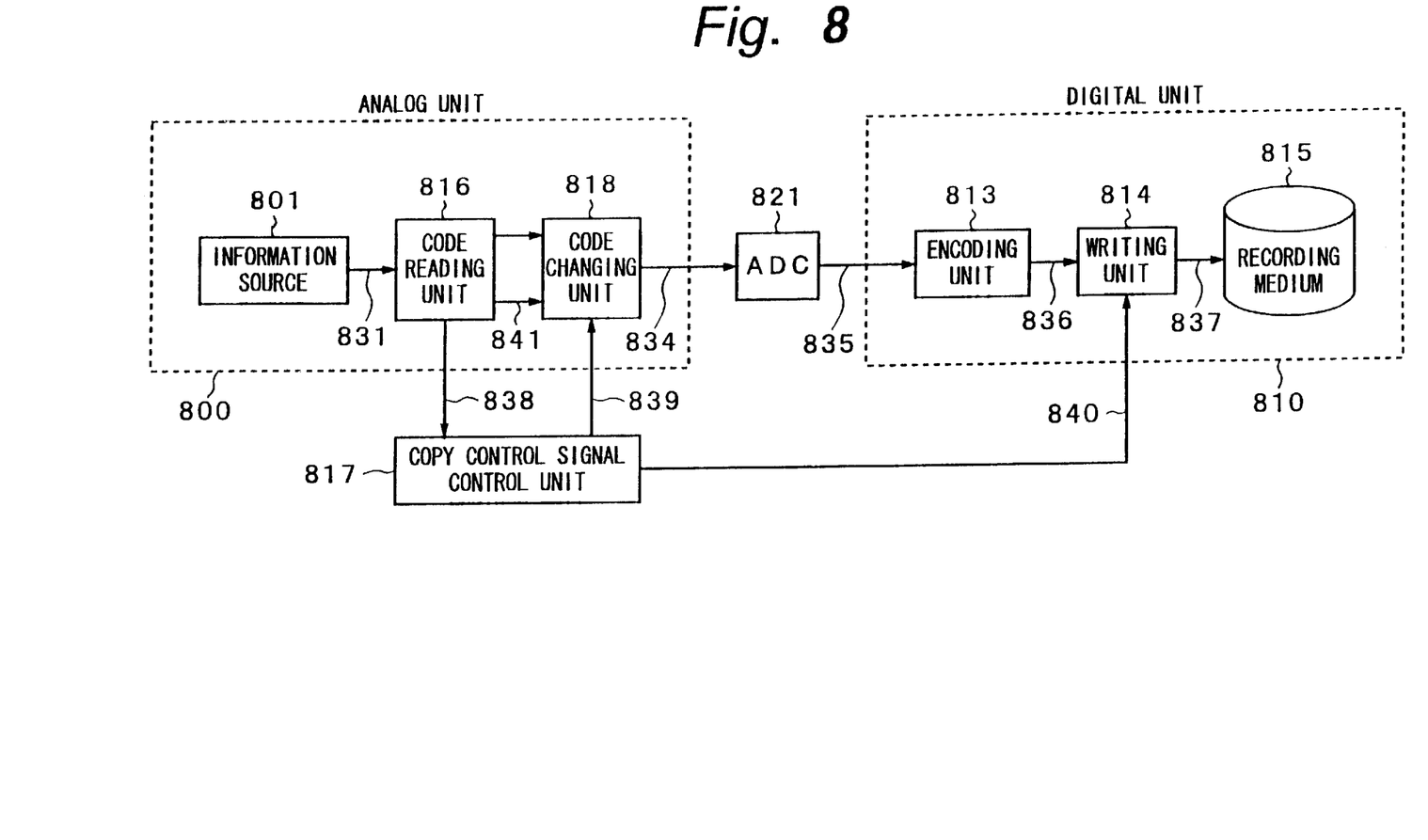
FIG. 8 is a block diagram of another embodiment of a recording apparatus by an analog signal of a copy control code according to the invention.

FIG. 8 shows another embodiment of a recording apparatus according to the invention. As shown in FIG. 8, the analog unit 800 includes: a code reading unit 816 for extracting the spread spectrum processed copy control code multiplexed to the analog signal 831 from the information source 801; and a code changing unit 818 for changing the copy control code. The code changing unit 818 generates the synthesis signal 834 in which the copy control code which was spread spectrum processed was multiplexed to the analog information signal. The synthesis signal 834 is converted into the digital signal 835 by the ADC (analog/digital converter) 821. The digital signal 835 is supplied to the encoding unit 813 of the digital unit 810. An output signal of the ADC 821 is recorded into the recording medium 815 by the digital unit 810 in a manner similar to the foregoing embodiment. As specific examples of the information to be recorded, there are audio information and/or video information. The recording medium 815 is a tape-shaped or disk-shaped medium in which a digital signal can be optically or magnetically recorded.

A copy control code 838 extracted by the code reading unit 816 is supplied to a copy control signal control unit 817. The control unit 817 decodes the original copy control code and generates a copy control code 839 to be newly recorded. The copy control code 839 after the change is supplied to the code changing unit 818 and the copy control code in the synthesis signal 834 is changed. For example, when the original copy control code denotes that the copy is permitted or inhibited, the new copy control code is also made identical to the original copy control code. When the original copy control code denotes that the copy of one generation is permitted, the new copy control code is changed to a code indicative of the copy inhibition.

When an original copy control signal 840 which is supplied from the copy control signal control unit 817 denotes the copy permission, the writing unit 814 records an output of the encoding unit 813 into the recording medium 815. When the signal 840 denotes the copy inhibition, the writing unit 814 doesn't record the output of the encoding unit 813 to the recording medium 815.

As will be explained hereinlater, the code reading unit 816 executes a process for an inverse spread spectrum and generates the copy control code 838 and also generates the synthesis signal and a control signal 841 for synchronization control to the code changing unit 818. As will be explained hereinlater, the code changing unit 818 erases the original copy control code by the inverse spread spectrum and, subsequently, synthesizes the new copy control code 839 by the spread spectrum. The code changing unit 818 receives the control signal 841 which is used for the synchronization control that is executed for the inverse spread spectrum from the code reading unit 816.

The copy control code is, for example, a code of two bits and is information to instruct a control about the copy as shown below.

Figure 9:
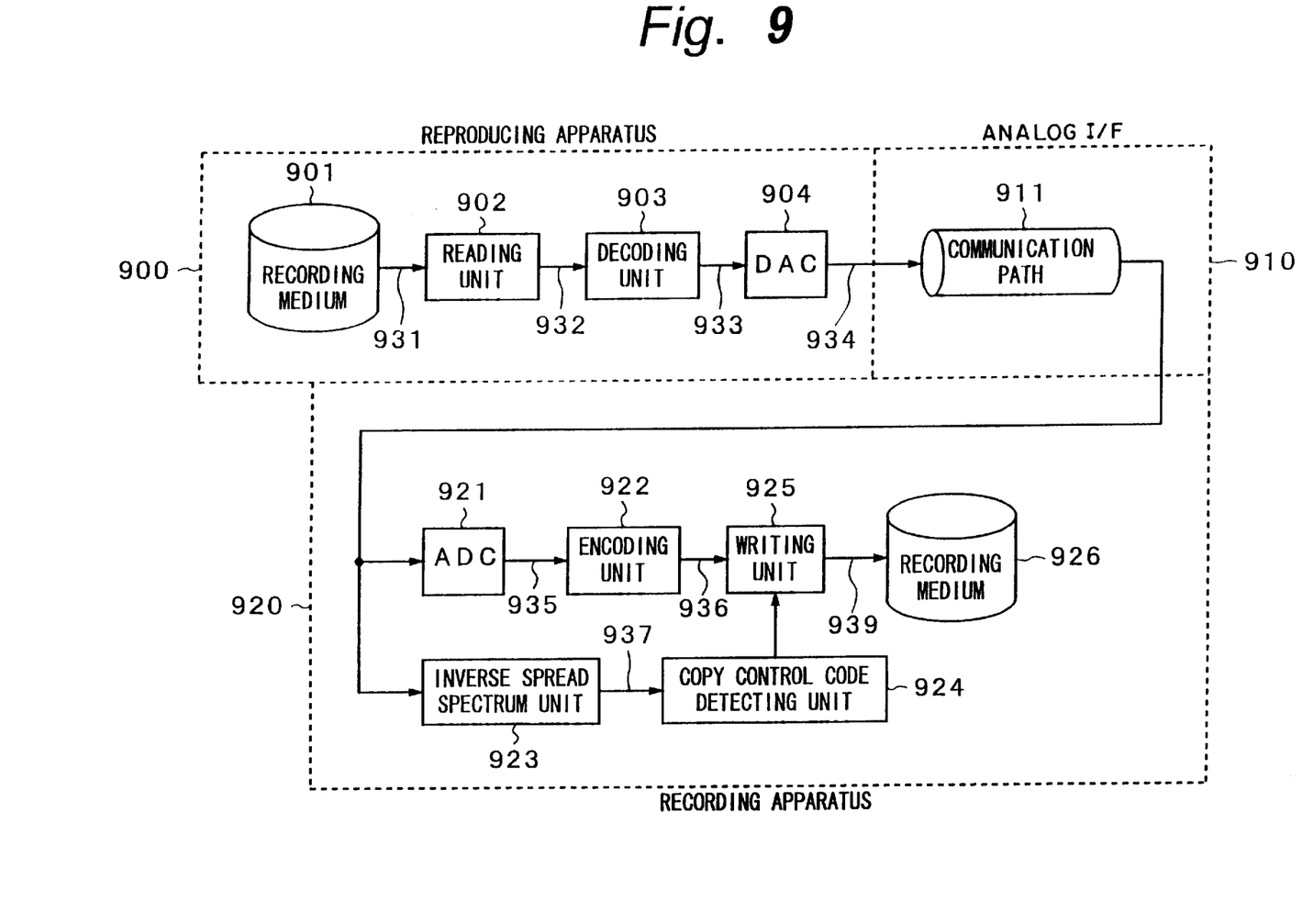
FIG. 9 is a block diagram of an embodiment of a copy system according to the invention.

00: can be copied
01: undefined
10: copy of one generation can be performed
11: copy is inhibited An embodiment of a copy system using a recording medium in which the synthesis signal to which the copy control code had been multiplexed has digitally been recorded by the construction of FIG. 7 or 8 will now be described with reference to FIG. 9. In FIG. 9, a reproducing apparatus 900 reproduces a recording medium 901 in which a synthesis signal has digitally been recorded.

In the reproducing apparatus 900, a read signal 931 outputted from the recording medium 901 for reproduction is set to a digital reproduction signal 932 by a reading unit 902 and is inputted to a decoding unit 903 and is decoded into a digital decoding signal 933 by the decoding unit 903. Further, the signal 933 is converted into an analog synthesis signal 934 by a DAC (digital/analog converter) 904. The analog synthesis signal 934 is supplied to an ADC 921 and an inverse spread spectrum unit 923 in a recording apparatus 920 through a communication path 911 of an analog interface 910. A copy control code which was spread spectrum processed has been added to the analog synthesis signal 934.

In the recording apparatus 920, a digital information signal 935 from the ADC 921 is encoded by an encoding unit 922. An encoding signal 936 from the encoding unit 922 is supplied to a writing unit 925. A write signal 939 from the writing unit 925 is recorded into a recording medium 926 for recording. A signal 937 which was inversely spread by the inverse spread spectrum unit 923 is inputted to a copy control code detecting unit 924 and a copy control code 938 is detected. The writing unit 925 is controlled by the copy control code 938. When the copy is permitted in accordance with the copy control code 938, the writing is performed. When the copy is inhibited, the writing is inhibited. As mentioned above, by adding the copy control signal to the same band as that of the information source signal in an analogwise manner by the spread spectrum, there is obtained an effect such that even in the digital data recording apparatus connected in an analogwise manner, the recording can be controlled without extinguishing the copy control signal.

Figure 10:
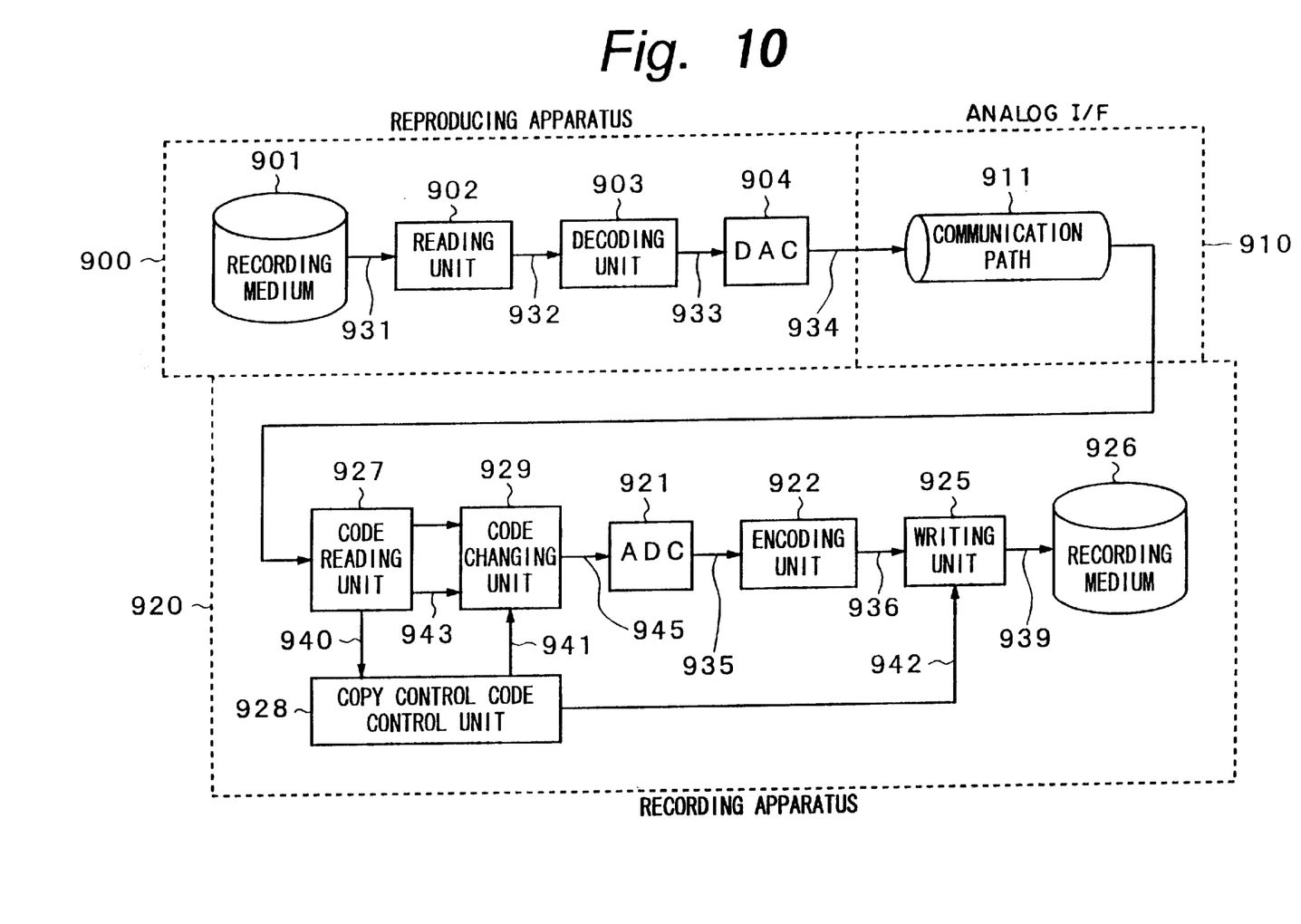
FIG. 10 is a block diagram of another embodiment of a copy system according to the invention.

FIG. 10 shows another embodiment of a copy system according to the invention. In a manner similar to the embodiment of FIG. 9, the reproducing apparatus 900 reproduces the recording medium 901, generates the analog synthesis signal 934 in which the analog information signal and the copy control code have been synthesized, and supplies the signal 934 to the recording apparatus 920 through the communication path 911 of the analog interface 910.

The analog synthesis signal 934 is supplied to a code reading unit 927 of the recording apparatus 920 and a multiplexed copy control code 940 is extracted. A code changing unit 929 to change the copy control code is provided. The code changing unit 929 generates a synthesis signal 945 in which the spread spectrum processed copy control code has been multiplexed to the analog information signal. The synthesis signal 945 is converted into the digital signal 935 by the ADC 921. The digital signal is supplied to the encoding unit 922. In a manner similar to the foregoing embodiment, the output signal of the ADC 921 is recorded into the recording medium 926 by the encoding unit 922.

The copy control code 940 extracted by the code reading unit 927 is supplied to a copy control code control unit 928. The control unit 928 decodes the original copy control code 940 and generates a copy control code 941 to be newly recorded. The copy control code 941 after the change is supplied to the code changing unit 929 and the copy control code in the synthesis signal 945 is changed. For example, when the original copy control code indicates the copy permission or copy inhibition, the new copy control code is also made identical to the original copy control code. When the original copy control code denotes the permission of the copy of one generation, the new copy control code is changed to the code indicative of the copy inhibition.

As will be explained hereinlater, the code reading unit 927 executes a process of the inverse spread spectrum, generates the copy control code 940, and also generates the synthesis signal and a control signal 943 which is used for synchronization control to the code changing unit 929. As will be explained hereinlater, the code changing unit 929 erases the original control code by the inverse spread spectrum which was sync controlled by the control signal 943 and, subsequently, synthesizes the new copy control code 941 by the spread spectrum.

Figure 11:
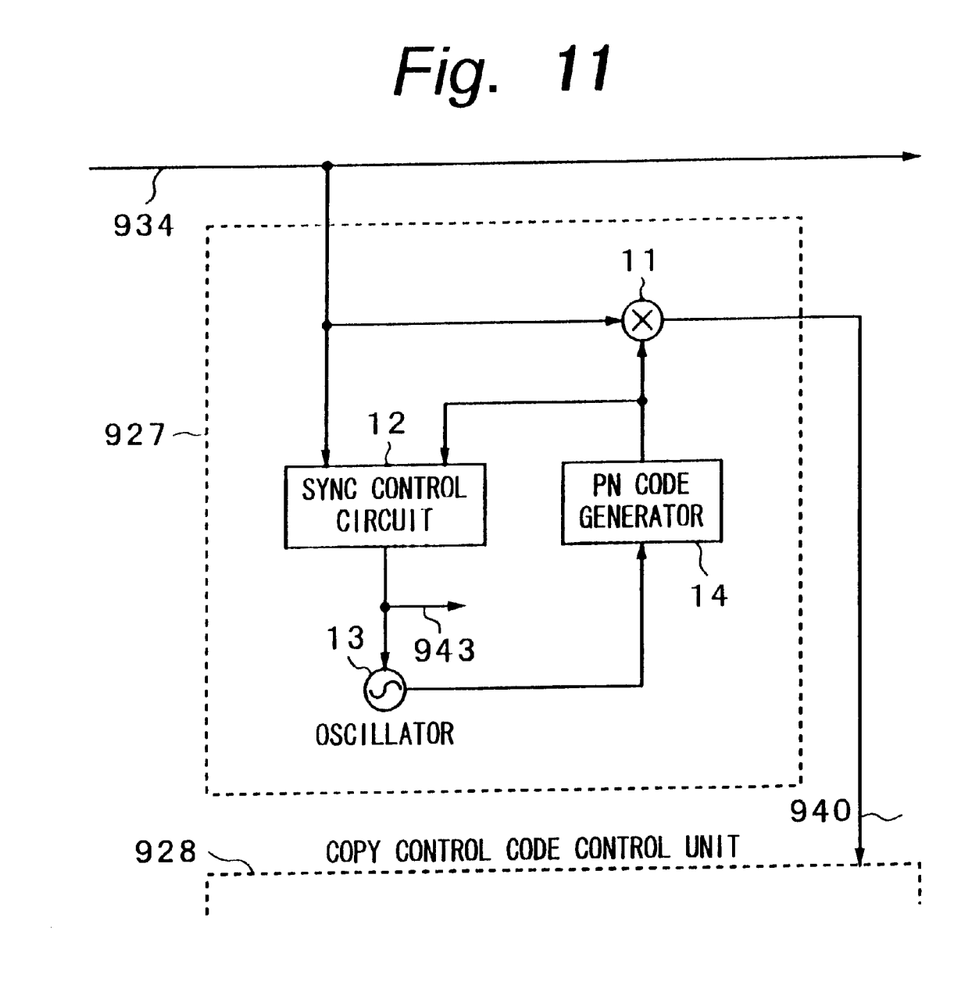
FIG. 11 is a block diagram showing a construction of an example of a code reading unit in another embodiment of the copy system according to the invention.

FIG. 11 shows an example of the code reading unit 927 (similar to 816 as well). The synthesis signal 934 is supplied to a multiplier 11 and a sync control circuit 12. A PN (pseudo noise) code from a PN code generator 14 is supplied to the multiplier 11 and sync control circuit 12. The sync control circuit 12 extracts the timing signal 943 by using a fact that the PN code has a steep autocorrelation. An oscillating frequency and a phase of an oscillator 13 are controlled by the extracted timing signal 943 and an output signal of the oscillator 13 is supplied to the PN code generator 14. The PN code generated from the output of the oscillator 13 which was sync controlled and the synthesis signal 934 are multiplied by the multiplier 11, so that the demodulated copy control code 940 is derived from the multiplier 11. The copy control code 940 is supplied to the control unit 928.

As a PN code, an M sequence (maximum length sequence), GOLD code, or the like can be used. In case of the M sequence, for example, the former half sequence of its period and one bit on the lower significant side of the copy control code (two bits) are multiplied. The latter half sequence of the period and one bit on the higher significant side are multiplied and the modulation of the spread spectrum is executed. A way of modulating the copy control code by the spread spectrum is not limited to such an example but other various methods can be used. For example, after the copy control code was linear-modulated, the spread spectrum modulation can be also performed. The invention is not limited to the direct modulation but the signal can be also modulated by a frequency hopping method or a time hopping method. Further, different PN codes can be also used for the spread spectrum and a few kinds of orthogonal codes can be also multiplied.

Figure 12:
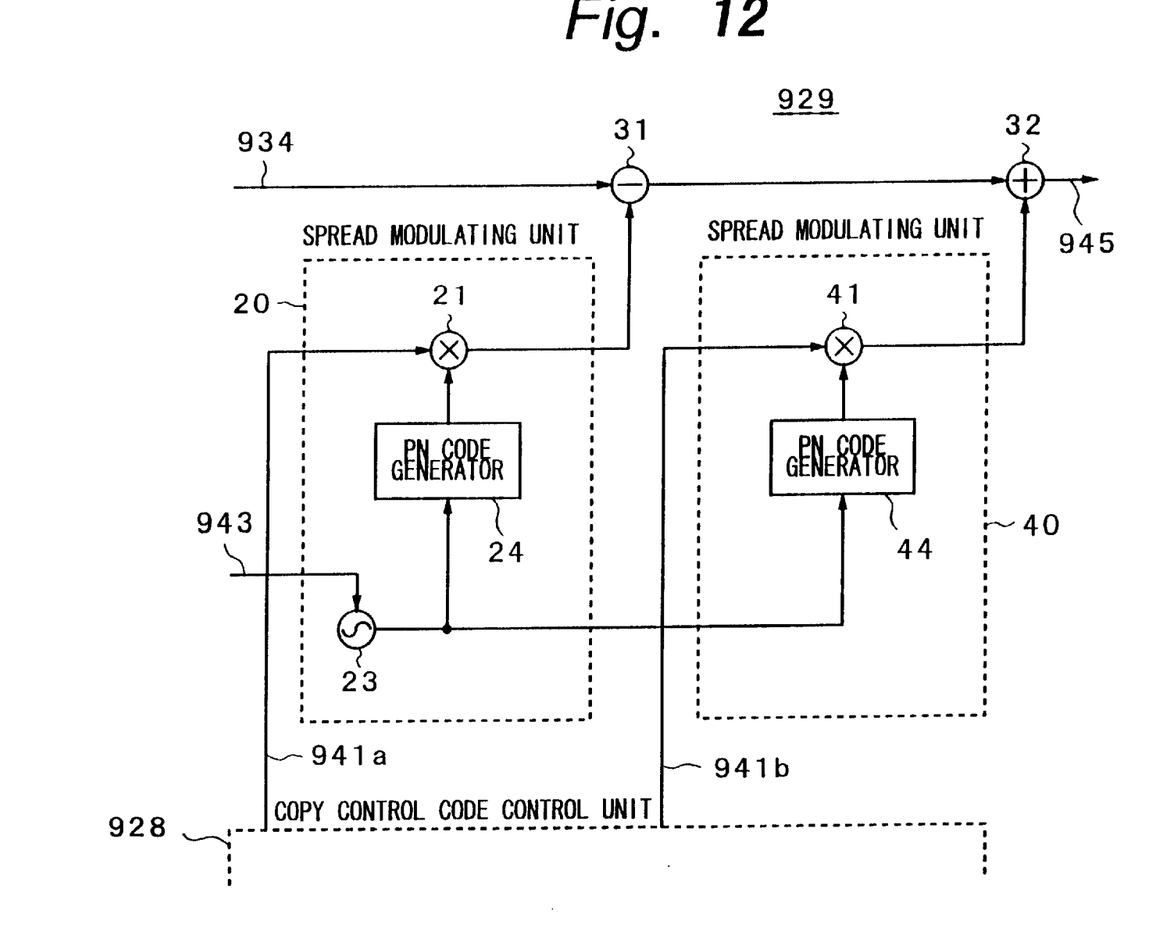
FIG. 12 is a block diagram showing a construction of an example of a code changing unit in another embodiment of the copy system according to the invention.

FIG. 12 shows an example of the code changing unit 929 (similar to 818 as well). The synthesis signal 934 is supplied to a subtractor 31. A signal generated by a spread modulating unit 20 is supplied to the subtractor 31. The modulating unit 20 is constructed by a multiplier 21, an oscillator 23, and a PN code generator 24. The sync control signal 943 from the code reading unit 927 is supplied to the oscillator 23. An output of the oscillator 23 is supplied to the PN code generator 24 and the PN code in which a frequency and a phase are the same as those upon modulation is generated. Same information 941a as the copy control code extracted by the reading unit 927 is supplied from the control unit 928 to the multiplier 21. Therefore, by supplying an output of the multiplier 21 to the subtractor 31, the modulation copy control code included in the synthesis signal is erased.

An output signal of the subtractor 31 is supplied to an adder 32. A signal generated by a spread modulating unit 40 is supplied to the adder 32. The modulating unit 40 is constructed by a multiplier 41 and a PN code generator 44. The output of the oscillator 23 of the modulating unit 20 is supplied to the PN code generator 44 and a PN code in which a frequency and a phase are the same as those upon modulation is generated. A copy control code 941b to be newly added is supplied from the control unit 928 to the multiplier 41. Therefore, by supplying an output of the multiplier 41 to the adder 32, the copy control code can be newly added.

According to the above embodiment, the copy control code is synthesized in an analogwise manner. In the invention, however, information to be synthesized is not limited to the copy control code. For example, it is also possible to modulate copyright management information by the spread spectrum together with the copy control code and to multiplex the resultant modulated information to the analog information signal. The copyright management information is information that is necessary for a right management of the name of author, reversion of the right regarding a literary work, use conditions, identification number, and the like.

Further, the invention is not limited to the case of recording into the recording medium but can be also applied to a case of transmitting the analog information signal by a wire or a radio manner. Namely, addition information which was modulated by the spread spectrum can be also added to the analog information signal to be transmitted. On the reception side, the addition information is detected by the inverse spread spectrum and, on the basis of it, for example, the permission or inhibition of the reproduction of the analog information signal on the reception side is controlled.

According to the invention, by spread spectrum processing the addition information such as a copy control signal or the like, the band is widened and the addition information is added to the signal band of the information source, the copy control signal cannot be deleted by a filter or the like. So long as the synchronization cannot be obtained for the timing when the spread spectrum is performed, it is difficult to perform not only the detection of the copy control signal but also the detection of the addition of the signal. Therefore, according to the invention, the copy control can be certainly executed. According to the invention, since the spread spectrum processed signal is added, an influence by a deterioration or the like is hardly exerted on the original data. According to the invention as mentioned above, even after the digital signal was D/A converted, the copy control signal is not deleted. Therefore, the copy can be prevented for the digital data recording apparatus which is connected in an analogwise manner and the copy control signal is also preserved even in the signal recorded in the analog recording apparatus. There is a very high copy prevention effect. Further, by multiplying the kind of spread spectrum and the orthogonal functions, an amount of information which can be added can be freely controlled.

The present invention is not limited to the foregoing embodiments but many modifications and variations are possible within the spirit and scope of the appended claims of the invention.

What is claimed is:

1. An information signal synthesizing apparatus comprising:
    an information reading circuit to which a synthesis signal of a main information signal and a sub information signal which was spread spectrum processed to form a spread spectrum processed sub information signal is supplied and which executes an inverse spread spectrum process to said spread spectrum processed sub information signal and reproduces said sub information signal and outputs said main information signal;
    a sub information signal control circuit for changing said sub information signal which is supplied from said information reading circuit based on an updated copy status, thereby forming a changed sub information signal;
    a spread spectrum circuit for executing a spread spectrum process to said changed sub information signal from said sub information control circuit;
    a synthesizer to which said changed sub information signal which was spread spectrum processed and said main information signal from said information reading circuit are supplied and which forms a synthesis signal therefrom;
    an analog/digital converter for converting said synthesis signal formed by said synthesizer into a digital signal; and
    an encoding circuit for encoding said digital signal.

2. An information signal recording apparatus comprising:
    an information reading circuit to which a synthesis signal of a main information signal and a spread spectrum processed copy control signal is supplied and which executes an inverse spread spectrum process to said spread spectrum processed copy control signal, reproduces said copy control signal, and outputs said main information signal;
    a copy control signal control circuit for changing said copy control signal supplied from said reading circuit based on an updated copy status, thereby forming a changed copy control signal;
    a spread spectrum circuit for executing a spread spectrum process to said changed copy control signal from said copy control signal control circuit;
    a synthesizer to which said changed copy control signal which was spread spectrum processed and said main information signal from said information reading circuit are supplied and which forms a synthesis signal therefrom; and
    a recorder in which permission and inhibition of recording of said synthesis signal formed by said synthesizer to a recording medium are controlled in accordance with said copy control signal.

3. An information signal synthesizing method comprising the steps of:
    executing an inverse spread spectrum process to a spread spectrum processed sub information signal from a synthesis signal of a main information signal and said spread spectrum processed sub information signal, reproducing said sub information signal, and outputting said main information signal;
    changing said sub information signal based on an updated copy status and forming a changed sub information signal;
    executing a spread spectrum process to said changed sub information signal;
    forming a synthesis signal of said changed sub information signal which was spread spectrum processed and said main information signal from said changed sub information signal and said main information signal;
    converting said synthesis signal into a digital signal;
    encoding said digital signal; and
    recording said digital signal.

* * * * *